June 28, 1966  A. STALDER  3,258,218
INTERMITTENT DRIVE FOR A FISHING REEL
Filed Nov. 26, 1963

INVENTOR
Adolf Stalder
BY
Watson, Cole, Grindle & Watson
Attys.

3,258,218
INTERMITTENT DRIVE FOR A FISHING REEL
Adolf Stalder, Schmerikon, St. Gallen, Switzerland
Filed Nov. 26, 1963, Ser. No. 325,946
Claims priority, application Switzerland, Nov. 28, 1962,
13,963/62
8 Claims. (Cl. 242—84.54)

This invention relates to a fishing reel of the casting type for use on rods, having a line wind-up device which can be set into rotation by means of a handcrank and a speedup gear fitted in a casing.

In almost all fishing reels of the type known heretofore, uniform turning of the handcrank causes also uniform turning of the line wind-up device. Numerous sport anglers, however, are aware that, when fishing with spinning artificial or natural bait, the attracting of fish is favored by drawing the line in by jerks. The present invention is based on this knowledge. Accordingly, the object of the invention is to create a fishing reel in which, by uniform operation of the handcrank, a non-uniform turning of the wind-up device is possible in order to cause the desired jerky reeling-in of the line.

It is therefore an object according to the invention to provide a fishing reel in which the handcrank is connected to the speed-up gear through a coupling, means being provided and adapted, upon the handcrank being turned, to periodically engage the coupling and disengage it for a short time.

Further details of the invention will appear from the following description and claims, taken in conjunction with the accompanying drawing wherein there is shown, purely by way of example, one preferred form of embodiment of the object of invention.

Figure 1:
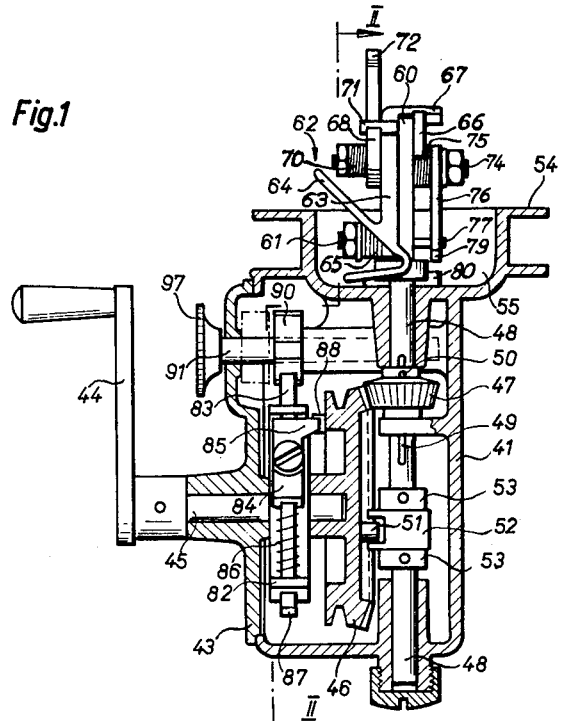
FIG. 1 is a vertical sectional view showing a fishing reel designed in accordance with the invention, partly in side elevation with the section taken on the line I—I of FIG. 2 in the direction of the arrows.

The fishing reel illustrated comprises a casing 41 which is fixed on a fishing rod (not shown) in known manner by means of a holder 42. One removable sidewall 43 of the casing 41 has a handcrank 44 rotatably carried thereon by means of a shaft 45. Within casing 41 there is a bevel wheel 46 which is arranged on shaft 45 and connected therewith through a coupling described as description proceeds. The bevel wheel 46 meshes with a smaller bevel wheel 47 which is mounted on an axle 48 rotatably supported and endwise displaceable in casing 41. The two bevel wheels 46 and 47 form together a speed-up gear.

The axle 48 has a longitudinal slot 49, in which engages a driving screw arranged on wheel 47 so as to couple the axle 48 for rotation with wheel 47. Wheel 47 is secured against axial displacement by a bearing projected from casing 41 and a collar near the forward end of axle 48. Provided on bevel wheel 46 is an eccentrically located pin 51 adapted to engage a slot of a block 52, the slot extending at right angles to axle 48 and tangentially. Axle 48 passes rotatably through a bore in block 52, but is coupled to said block by two set rings 53 firmly seated on axle 48 for movement in the longitudinal direction thereof. When the wheel 46 turns, the axle 48 is not only turned by means of the small wheel 47, but also reciprocated by means of the eccentric pin 51, block 52 and set rings 53.

Casing 41 has formed thereon a line spool 54 which is coaxial with axle 48, fixed and non-rotatable. Spool 54 has a hollow space 55 which surrounds the axle 48 and is open at the side away from the casing 41 to provide space for the winding means. The end of axle 48 projecting into the hollow space 55 is rigidly connected to a plate-shaped carrier 60 having a line-guide 62 swingably mounted thereon by means of a bolt 61 extending at right-angles to the axle 48, the line-guide including a fork-shaped member 64 running round the spool 54. The design of the line-guide 62 is not an essential part of the invention and is not further explained here. It may be any line-guide of a conventional type.

In the structure shown in the drawing the fork-shaped member 64 is fixed on a plate 63 swingable about the bolt 61. A torsion spring 65 wound on the bolt 61 tends to swing the line guide 62 in the operative position shown in FIGS. 1 and 2. The carrier 60 is provided with a rubber stop 66 against which a finger 67 projecting from the plate 63 abuts when the line-guide is in its operative position.

Figure 2:
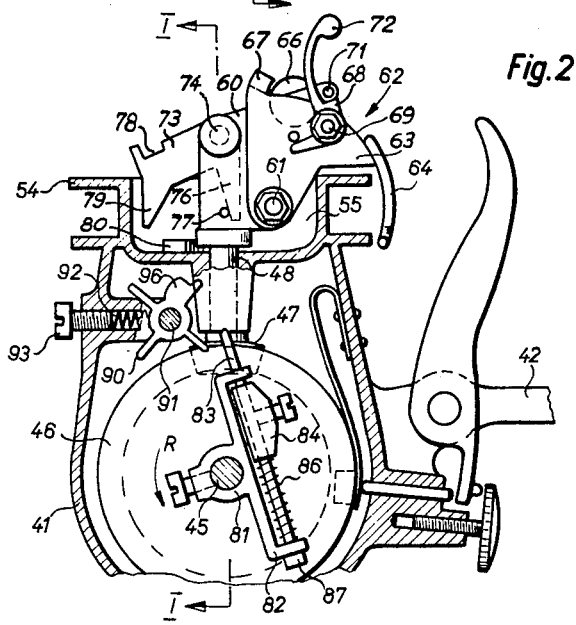
FIGURE 2 represents the fishing reel, partly in side view and partly in section taken on the line II—II of FIG. 1 in the direction of the arrows.

A pawl 68 is pivotally mounted on the plate 63 by means of a pin 69, and is biased by a spring 70 to swing in clockwise direction, FIG. 2. The pawl 68 is adapted to engage a pin 71 fixed to the carrier 60, in order to secure the line guide 62 in the operative position. The pawl 68 is provided with a handle 72 which enables the pawl to be disengaged from the pin 71 and to swing the line guide 62 in counter clockwise direction into an inoperative position.

In the latter position, the line guide is locked by means of a locking-arm 73 pivotally mounted on the carrier 60 by means of a bolt 74. A spring 75 urges the arm 73 in clockwise direction, FIG. 2, until a second arm 76, rigidly connected with the locking arm 73, abuts against a stop pin 77 fixed on the carrier 60. The locking-arm 73 is provided with a notch 78, in which the finger 67 enters when the line-guide 62 is swung into the inoperative position for locking the line-guide in this position. Furthermore, the locking-arm 73 has a projection 79 intended to cooperate with a stationary cam 80 when the line-guide 62 is in its inoperative position and rotated with the axle 48.

For coupling the crankshaft 45 to the toothed wheel 46, the following means are provided: Shaft 45 has mounted thereon a set ring 81 (FIG. 2) on which a stirrup-shaped guide 82 is formed. Carried within the latter is a rod-shaped slider 83 for endwise displacement. Slider 83 extends tangentially to shaft 45 and carries a firmly seated rider 84 with a driving abutment 85 (FIG. 1) projecting towards wheel 46. A compression spring 86 encircling the slider 83 is supported at one end against the rider 84 and at the other end against one arm of the stirrup-shaped guide 82 and tends to push the slider 83, together with the rider, in a certain definite direction until a head 87 of the slider abuts on guide 82. Wheel 46 has an abutment 88 which projects into the path of motion of the driving abutment 85 and is driven by the same (FIG. 1). The coupling between shaft 45 and wheel 46 thus formed by the driving and driven abutments 85 and 88 is maintained in engagement by the action of spring 86.

The end portion of slide 83 remote from the head 87 serves as an actuating member of a step-by-step mechanism including a wingwheel 90. The latter, which is firmly seated on a shaft 91 carried in casing 41 eccentric to crankshaft 45, has four wings, one of which always projects into the path of motion of said end portion of slider 83 serving as actuating member. Shaft 91 is provided with an adjustable brake which includes a spring 92 pressing on shaft 91, the action of the spring being adjustable by a screw 93 (FIG. 2). One of said four wings of the wingwheel 90 has formed thereon a cam 96 which cooperates with said end portion of the slider 83 and is capable of pushing the slider 83 against the action of spring 86, thus moving the driving abutment 85 out of the path of motion of the cooperative abutment 88, in order to disengage the coupling between crankshaft 45 and wheel 46.

Shaft 91 carrying the wingwheel 90 projects with one of its ends out of the casing wall 43 and carries there a holder knob 97 (FIG. 1) by means of which shaft 91 together with wingwheel 90 can be displaced axially until the wingwheel 90 finds itself entirely outside the path of motion of slider 83 in a non-operating position, as shown in FIG. 1 in dash-dotted lines.

Before throwing the fishing-fly, the line-guide 62 is swung upward and backward in its inoperative position by pressing against the handle 72 from the right in FIG. 1. Thereby, the finger 67 slides over the upper edge of the locking arm 73 which is moved downward against the action of the spring 75. When the finger 67 falls into the notch 78 the line guide 62 is locked in its inoperative position and the fork-shaped member 64 is moved out of the unwinding path of the line which now can be drawn off from the spool 54 in the axial direction thereof. Then the fly may be thrown in the usual manner.

If the knob 97 has been pulled out, the wingwheel is outside the path of motion of the slider 83. As the crank 44 is turned in the sense indicated by the arrow R in FIG. 2, the wheel 46 is turned in the same sense of rotation by means of the driving and driven abutments 85 and 88. Through wheel 47 and axle 48, the line-guide 62 is set turning. Within the first revolution of the line-guide, the projection 79 runs against the radially inner surface of the cam 80 whereby the locking-arm 73 is urged downward. With this, the finger 67 is set free and the line-guide 62, under the action of the spring 65, automatically swings in its operative position shown in FIGS. 1 and 2. On the further rotation of the line-guide 62 its forked-shaped guide member 64 takes hold at the line and winds it onto spool 54. At the same time—by means of the eccentric pin 51, block 52 and set rings 53—the axle 48 is reciprocated endwise, with concomitant corresponding reciprocatory motion of the guide-member 64, thus causing the winding to be uniformly distributed on spool 54. Turning of the line-guide 62 is also uniform when the turning of handcrank 44 is uniform.

If it is desired to wind the fishing line in jerkingly, the knob 97 is pressed against casing 41 so as to bring wingwheel 90 into the path of motion of slide 83. Then, upon each rotation of the handcrank 44, the projecting actuating end of the slider 83 is caused to move against a wing of wingwheel 90, thus turning the same through 90°. When the wing with cam 96 comes into action, the same turning of the wingwheel occurs, but at the same time the cam 96 pushes the slider 83 downwards against the action of spring 86 so that the driving abutment 85 on rider 84 is disengaged from the driven abutment 88. The coupling between crankshaft 45 and wheel 46 is thereby disengaged with the result that, as the crank 44 is turned further, the wheel 46 remains at rest and therewith also line-guide 62. Not until the crank 44 is turned further through approximately 360°, will the driving abutment 85 strike on the abutment 88 at the wheel 46 so that the coupling is re-engaged and the line-guide 62 is thereupon driven again. During three successive revolutions of the handcrank 44, the line-guide is uniformly driven, but at the fourth revolution the coupling between crankshaft 45 and wheel 46 is again disengaged automatically as described above. The described operations repeat as long as the handcrank 44 is turned and the knob 97 is pushed in. Accordingly, with uniform turning of the handcrank 44, there is a jerky draw-in and wind-up of the fishing line.

What I claim is:

1. A fishing reel comprising a casing, line winding means rotatably mounted on said casing, rotatable handcrank means, drive means within said casing adapted to connect said handcrank means and line winding means, said drive means including a speed-up gear, a coupling adapted to releasably connect said handcrank means to said speed-up gear, said coupling including a spring normally urging said coupling into connecting relation with said handcrank means and speed-up gear, and actuating means responsive to rotation of said handcrank means to temporarily disconnect said coupling from said speed-up gear after a predetermined number of revolutions of said handcrank means.

2. A fishing reel according to claim 1, in which means are provided mounting said actuating means for selective movement out of its normal operating position to a nonoperating position.

3. A fishing reel according to claim 1, in which said coupling comprises a driving abutment operatively connected for rotation to said handcrank means, a driven abutment connected to the speed-up gear and projecting into the path of motion of said driving abutment, and means mounting one of said abutments for movement against the action of said spring to a position out of the path of motion of the other abutment for temporarily disconnecting said coupling.

4. A fishing reel according to claim 3, in which said coupling further comprises a slider rotatable with said handcrank means and mounting said driving abutment, said actuating means comprising a step-by-step mechanism in the form of a rotatable wingwheel mounted on said casing eccentric with respect to said handcrank means, said slider having an end portion operable upon its rotation to operate said wingwheel, and said wingwheel including a cam cooperating with the end portion of said slider for disengaging the driving abutment from the driven abutment during one step of said wingwheel during each complete rotation thereof.

5. A fishing reel according to claim 4, in which means are provided mounting said wingwheel for selective axial movement into and out of the path of movement of the end portion of said slider.

6. A fishing reel comprising a casing, line winding means rotatably mounted on said casing, handcrank means including a shaft rotatably mounted in said casing, drive means within said casing adapted to connect said handcrank means and line winding means, said drive means including a speed-up gear, a coupling adapted to releasably connect said handcrank means to said speed-up gear, said coupling including a spring normally urging said coupling into connecting relation with said handcrank means and speed-up gear, and a step-by-step mechanism operable by rotation of said handcrank means, said mechanism including a cam, and said coupling including a member for cooperation with said cam to temporarily disconnect said coupling against the urging of said spring after a predetermined number of steps of said step-by-step mechanism.

7. A fishing reel comprising a casing, line winding means rotatably mounted on said casing, handcrank means including a shaft rotatably mounted in said casing, drive means within said casing adapted to connect said handcrank means and line winding means, said drive means including a speed-up gear, a coupling adapted to releasably connect said handcrank means to said speed-up gear, said coupling including a spring normally urging said coupling into connecting relation with said handcrank means and speed-up gear, and a step-by-step mechanism including a wingwheel carried by said casing eccentric with respect to said shaft and operatively connected thereto, said wingwheel including a cam thereon to temporarily disconnect said coupling from said speed up gear after a predetermined number of steps of said step-by-step mechanism, said coupling including a member for cooperation with said cam to temporarily disconnect said coupling against the urging of said spring after a predetermined number of steps of said step-by-step mechanism.

8. A fishing reel according to claim 7, in which means are provided mounting said wingwheel for selective axial movement between a position operatively connected to said handcrank means and a second position disconnected therefrom.

References Cited by the Examiner
UNITED STATES PATENTS

| | | | |
|---|---|---|---|
| 1,619,448 | 3/1927 | Vance | 242—84.1 |
| 1,906,425 | 5/1933 | Scott | 242—84.1 X |
| 3,166,267 | 1/1965 | Rowe | 242—84.2 |

FOREIGN PATENTS 889,493 10/1943 France.

STANLEY N. GILREATH, *Primary Examiner.*

M. STEIN, *Examiner.*

B. S. TAYLOR, *Assistant Examiner.*